United States Patent
Anand et al.

(10) Patent No.: US 10,847,012 B2
(45) Date of Patent: Nov. 24, 2020

(54) SYSTEM AND METHOD FOR PERSONALIZED ALARM NOTIFICATIONS IN AN INDUSTRIAL AUTOMATION ENVIRONMENT

(71) Applicant: Rockwell Automation Technologies, Inc., Mayfield Heights, OH (US)

(72) Inventors: Ashish Anand, Mayfield Heights, OH (US); Kenneth S. Plache, Scottsdale, AZ (US); Kyle K. Reissner, Hudson, OH (US); Michael J. Ohlsen, Chesterland, OH (US); Kevin W. Peters, Aurora, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 68 days.

(21) Appl. No.: 15/718,930

(22) Filed: Sep. 28, 2017

(65) Prior Publication Data
US 2019/0096223 A1 Mar. 28, 2019

(51) Int. Cl.
| G08B 21/18 | (2006.01) |
| G08B 25/08 | (2006.01) |
| G08B 31/00 | (2006.01) |
| G06Q 30/02 | (2012.01) |
| H04W 4/02 | (2018.01) |

(52) U.S. Cl.
CPC ......... *G08B 21/18* (2013.01); *G06Q 30/0261* (2013.01); *G08B 25/08* (2013.01); *G08B 31/00* (2013.01); *H04W 4/02* (2013.01)

(58) Field of Classification Search
CPC ........ G08B 21/18; G08B 25/08; G08B 31/00; G06Q 30/0261; H04W 4/02
See application file for complete search history.

(56) References Cited

U.S. PATENT DOCUMENTS

| 8,219,115 B1* | 7/2012 | Nelissen | H04W 4/021 455/456.3 |
| 2013/0211559 A1* | 8/2013 | Lawson | G06Q 10/06315 700/83 |
| 2015/0170210 A1* | 6/2015 | Rhee | G06Q 30/0241 705/14.64 |
| 2015/0229884 A1* | 8/2015 | Kupiec | G08B 21/18 348/143 |
| 2017/0352244 A1* | 12/2017 | Moore | H04W 4/70 |
| 2018/0109955 A1* | 4/2018 | Nixon | G05B 15/02 |

* cited by examiner

*Primary Examiner* — Mohamed Barakat

(57) ABSTRACT

Systems, methods, and software are disclosed herein for generating one or more personalized alarm notifications in an industrial environment. In an implementation, including a storage device and a processing system coupled together, with a mobile application stored on the storage device and having program instructions that, when executed by the processing system, direct the processing system render a configuration module through which to receive user input specifying notification criteria related to alarms in an industrial process environment, upload the notification criteria to an alarm service that receives the alarms from the industrial process environment, receive a notification from the alarm service associated with one or more of the alarms that satisfy the notification criteria, display the notification in a notification module, and in response to a user selection of the notification, download the one or more alarms.

20 Claims, 11 Drawing Sheets

US 10,847,012 B2

SYSTEM AND METHOD FOR PERSONALIZED ALARM NOTIFICATIONS IN AN INDUSTRIAL AUTOMATION ENVIRONMENT

TECHNICAL FIELD

Aspects of the disclosure are related to computing hardware and software technology, and in particular to industrial automation applications.

TECHNICAL BACKGROUND

Industrial controllers and their associated I/O devices are central to the operation of modern automation systems. These controllers interact with field devices on the plant floor to control automated processes relating to such objectives as product manufacture, material handling, batch processing, supervisory control, and other such applications. When automated processes vary from the prescribed processes, alarms are utilized to notify of the deviation. In many cases, the industrial environment is very large, often covering many buildings or plants. Consequently, a variety of individuals monitor the various alarms that are presented by the Industrial controllers. In many cases, one individual may be interested in an entirely different set of alarms than another individual.

Because of the large number of industrial controllers, and, consequently, alarms that must be monitored and controlled in near real-time, the alarm data is collected and organized in an alarm service. With the large amount of data handled by the alarm service, and the large number of individuals monitoring alarms, customization of individual alarms from a centralized location can be onerous. Data relating to machine health, alarm statuses, operator feedback (e.g., manually entered reason codes associated with a downtime condition), electrical or mechanical load over time, and the like are often monitored, and in some cases recorded, on a continuous basis. This data is gathered in the alarm service, and the alarm service determines when alarms should signal. These alarms from the alarm service are often displayed in various locations in the industrial environment. This could include LED, LCD or CRT display screens, light beacons, audible alarms, vibratory alarms, etc.

The large quantity of data generated by modern automation systems makes it possible to apply a broad range of plant analytics to the automation systems and processes that make up an industrial enterprise or business. Reports, charts, and other human-readable formats are often available or may be created for plant personnel and others wishing to monitor and review the generated data in either a real-time mode or at a later time after the data has been stored.

These alarm indicators, while effective, may not be able to reach all operators at all times. If an operator is away from his or her post, for example, or if an operator oversees several alarms, the floor alarms may not be effective to convey the information to the operator.

Further, the triggering of alarms often creates a need to manually enter information related to the alarm. For example, a physical log of the alarms may be manually kept, and an operator may need to make that log after an alarm is signaled.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

Overview

Examples discussed herein relate to a system and method for personalized alarm notifications in an industrial environment, including a storage device and a processing system coupled together, with a mobile application stored on the storage device and having program instructions that, when executed by the processing system, direct the processing system render a configuration module through which to receive user input specifying notification criteria related to alarms in an industrial process environment, upload the notification criteria to an alarm service that receives the alarms from the industrial process environment, receive a notification from the alarm service associated with one or more of the alarms that satisfy the notification criteria, display the notification in a notification module, and in response to a user selection of the notification, download the one or more alarms.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Before any embodiments are explained in detail, it is to be understood that the embodiments described herein are not limited in their application to the details of construction and the arrangement of components set forth in the following description or illustrated in the following drawings. Embodiments may be practiced or carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "connected" and "coupled" are used broadly and encompass both direct and indirect mounting, connecting, and coupling. Further, "connected" and "coupled" are not restricted to physical or mechanical connections or couplings, and may include electrical connections or couplings, whether direct or indirect. Also, electronic communications and notifications may be performed using any known means including direct or indirect wired connections, wireless connections, and combinations thereof. Also, functionality described as being performed by one device may be distributed among a plurality of devices.

It should also be noted that a plurality of hardware and software based devices, as well as a plurality of different structural components may be used to implement the embodiments set forth herein. In addition, it should be understood that embodiments may include hardware, software, and electronic components that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments may be implemented in software (e.g., stored on non-transitory computer-readable medium) executable by one or more electronic processors.

Figure 1:
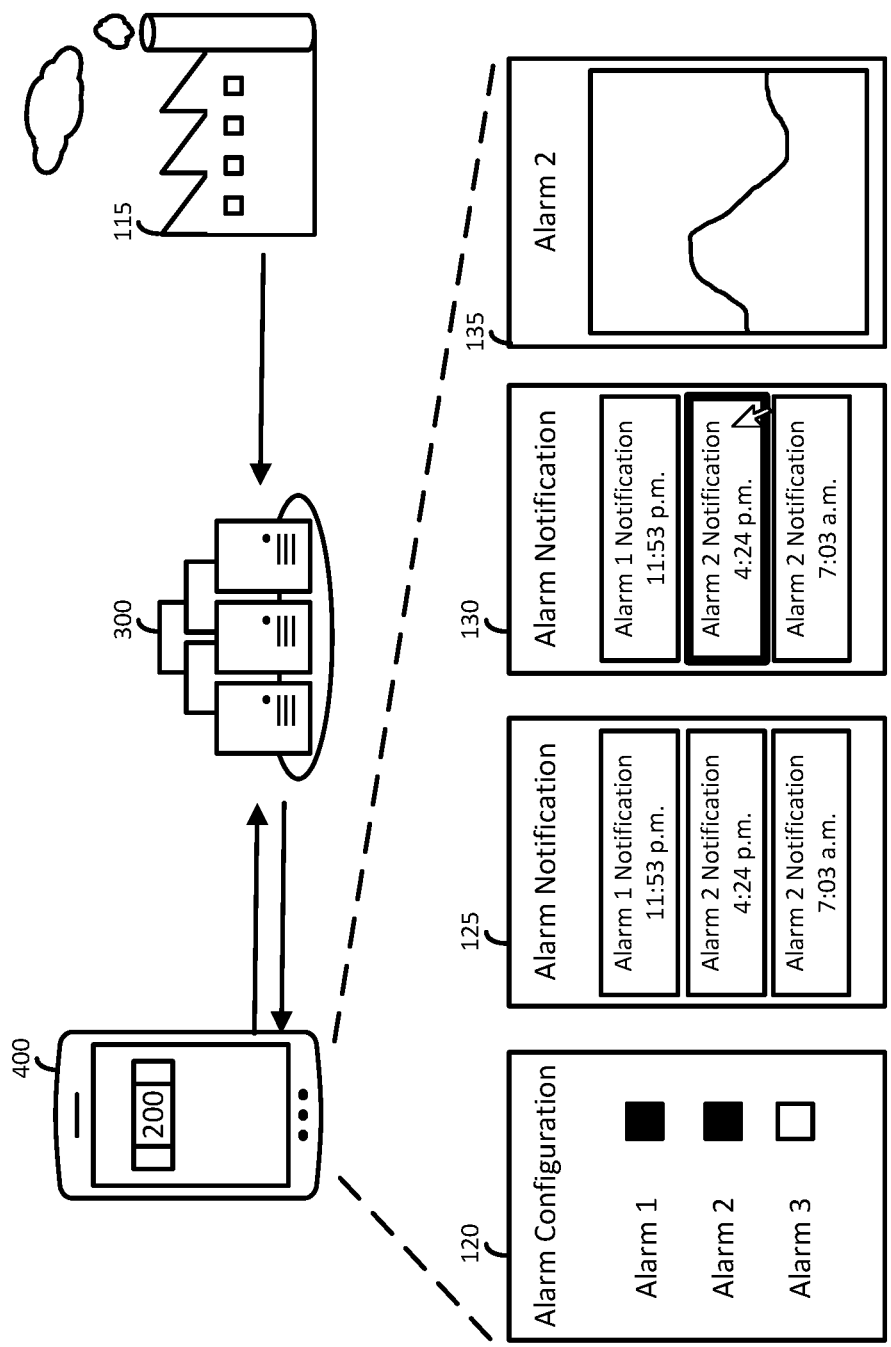
FIG. 1 is a block diagram of equipment and alarm customization in an exemplary implementation.

FIG. 1 illustrates a block diagram of equipment and alarm customization in an exemplary implementation. Industrial process environment 115 comprises an automobile manufacturing factory, food processing plant, oil drilling operation, microprocessor fabrication facility, or some other type of industrial enterprise. Industrial Process Environment 115 further comprises sensors, drives, pumps, filters, drills, motors, robots, fabrication machinery, mills, printers, or any other industrial automation equipment, including their associated control systems. A control system comprises, for example, automation controllers, programmable logic controllers (PLCs), programmable automation controllers (PACs), or any other controllers used in automation control. Additionally, Industrial Process Environment 115 could comprise other industrial equipment, such as a brew kettle in a brewery, a reserve of coal or other resources, or any other element that may reside in an industrial automation environment.

Industrial Process Environment 115 continually produces operational data over time. The operational data indicates the current status of the machine systems, such as parameters, pressure, temperature, speed, energy usage, operational equipment effectiveness (OEE), mean time between failure (MTBF), mean time to repair (MTTR), voltage, throughput volumes, times, tank levels, alarms, or any other performance status metrics. The operational data may comprise dynamic charts or trends, real-time video, or some other graphical content. Industrial Process Environment 115 is capable of transferring the operational data over a communication link to an alarms service 300, which will be discussed in more detail in FIG. 3, typically via a communication network.

Alarms Service 300 compiles, organizes and stores the operational data from Industrial Process Environment 115. In some cases, the operational data is provided to Alarms Service 300 as raw data, and Alarms Service 300 processes the data to determine what alarms need to be triggered. In other situations, alarms are provided directly to Alarms Service 300, which managed how those alarms are reported.

Figure 4:
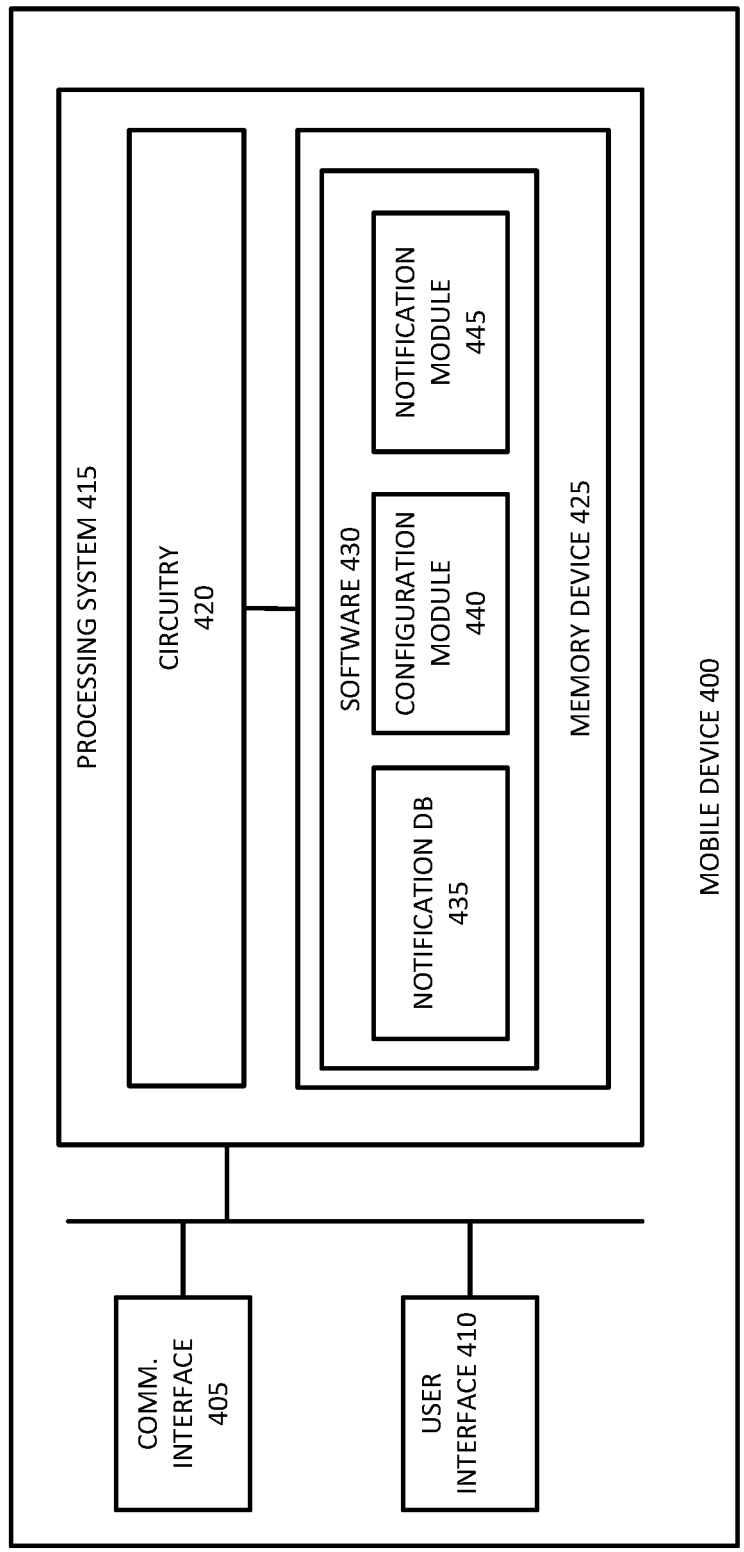
FIG. 4 is a schematic illustrating an apparatus in an exemplary implementation.

Alarms service 300 is communicatively connected to Mobile Device 400. Mobile Device 400 may be of a type specifically built for and dedicated to alarms management in an industrial process environment. In some cases, Mobile Device 400 may be a more general-purpose device having alarms management and configuration capabilities included therein, such as a personal computer, smart phone, tablet, or any other suitable computing device. In either case, Mobile Device 400 in FIG. 4 is representative of such devices.

Figure 2:
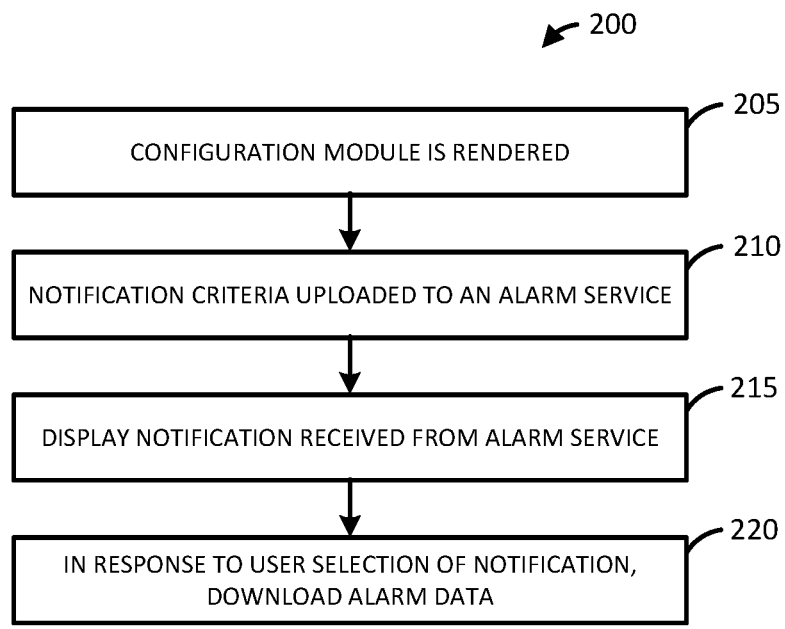
FIG. 2 is a method of alarm notification customization in an exemplary implementation.

Mobile Device 400 contains hardware and software to run Notification Method 200, which is discussed in more detail with FIG. 2. Mobile Device 400 is capable of displaying Alarm Configuration 120. As shown, Alarm Configuration 120 presents a number of available alarms, allowing a user to select the alarms of interest. This presentation could be through check boxes, as shown, or through some other well-known selection method (i.e. sliders, buttons, grab and drop, pick list, etc.) Further the Alarm Configuration 120 may allow creation of alarm criteria based on raw data from the Industrial Process Environment 115. In this manner, a user is able to customize the alarms to be presented based on the requirements of the individual user or operator, and the onerous task of configuring all alarms for all users in a centralized location is mitigated.

After the user has created notification configuration data at the Mobile Device 400, Mobile Device 400 transmits the notification configuration data to Alarms Service 300. Alarms Service 300 at some future point in time, will transmit an alarm notification to Mobile Device 400 that corresponds to the notification configuration data transmitted by Mobile Device 400. This alarm notification is displayed in Alarm Notification 125. In an implementation, Alarm Notification 125 displays individual boxes with alarm notifications. In additional implementations, the notifications may be presented as pop-ups, banners, audible or vibratory alarms, or may be represented by icons or pictures, for example.

In alarm Notification Selection 130, a user selects one or more of the alarm notifications presented on Mobile Device 400. This could occur through use of a touchscreen, joystick, mouse, keyboard, click wheel, touchpad, or any other similar selection tool. Similarly, the selection could be of an item related to the actual alarm notification (i.e. a "click here to see alarm data" box may be presented adjacent to the alarm notification, or something similar).

After the user selects the alarm notification, the Mobile Device 400 sends a request to the Alarms Service 300 for the alarm data, which can be displayed in Alarm Display 135. This alarm data may include real-time data from the Industrial Process Environment 115, or a snapshot of raw data from around the time of the alarm, a presentation of the alarm status of other alarms in proximity to the presented alarm, or any other relevant data. The alarm data may be parallel to alarm data presented within the industrial process environment 115, or it may be data uniquely designed for the Mobile Device 400.

In an implementation, Alarm Notification 125 may also display options to silence an alarm, acknowledge and alarm, open a log form relevant to an alarm or update an alarm notification configuration, among others.

In FIG. 2, the Notification Method 200 is represented according to an implementation. In step 205, a configuration module is rendered on the Mobile Device 400. This module allows a user to select or create alarm notifications based on the alarms data from the Industrial Process Environment. In an implementation, the rendering displays various available alarms that can be selected for notification. The available alarms may depend on various factors, such as physical location, job title or responsibilities, oversight responsibilities, etc. Thus, one user may see a selection of 7 available alarms to select, where another user may see a selection of 12 alarms to select, for example. Some of the available alarms may be grouped such that a user can select several alarm notifications relevant to the user's position or team by clicking a single selector, for example. This could, for instance, be a selector titled Mixing Team A Alarms, which would include Alarms related to the mixing speed, temperature, viscosity, time, and ingredient additions that relate to the area of the industrial process in which Team A works.

In another implementation, the configuration module may allow the user to enter customized parameters for alarm notifications that are desired. For example, the user may enter custom Boolean logic. In the case of a mixing area, for example, a user may enter if mixer A has been mixing at speed 4 for greater than 4 minutes, and ingredient B has not been added to the mixer, signal an alarm. Custom logic allows for the creation of many alarms that do not necessarily mirror alarms that are already present in the Industrial Process Environment 115. The alarms could also be predictive alarms, specific to items of interest to the individual user.

Once the notification criteria have been created or selected in the configuration module, the configuration data is transmitted to the Alarm Service 300 in step 210. The Alarm Service stores the configuration data, and reviews Alarm data for potential alarm notifications. When the Alarm Service 300 identifies a relevant alarm notification, the notification is transmitted to the Mobile Device 400.

The notification criteria may be created for the Mobile Device 400, such that any user that uses Mobil Device 400 will receive the selected alarm notifications. In another implementation, the notification criteria may be custom to a particular user. Thus, the notification criteria may be defined or selected on Mobile Device 400 specifically for an individual user—John Doe. Thereafter, when John Doe is logged in to any device (Mobile Device 400, a different mobile device, a Device within the Industrial Process Environment 115, etc.) John Doe will receive alarm notifications according to the notification criteria.

In Step 215, the alarm notification is displayed on the Mobile Device 400. This notification may take the form of a visual, audible or tactile alarm. Examples of a visual alarm could be a pop-up notification, a notification box in a window of notifications, and notification banner, or some other form. In an implementation, the display will present an option to select the notification, either by selecting the notification itself, or by selecting an option related to the notification, such as a separate box near the notification.

In Step 220, the Mobile Device 400 downloads alarm data in response to the selection of the notification. In an implementation, if the notification is selected, either by selecting the notification, or a separate item associated with the notification, the Mobile Device 400 requests alarm data from the Alarms Service 300. This data can be in the form of raw data (real-time or otherwise) from individual pieces of equipment in the Industrial Process Environment 115, a combination of multiple sources of raw data for the Industrial Process Environment 115, time-based tracking of alarm from the Industrial Process Environment 115, or some other such data. The configuration module from Step 205 could additionally grant the user control over what type of alarm data is supplied following selection of an alarm notification. In an implementation, by selecting the notification, Mobile Device 400 could automatically begin a workflow process related to the alarm. For example, selecting the notification may automatically open an acknowledgement log for a supervisor to acknowledge an alarm, or open a repair order related to the alarm, or add a note to the process log related to the alarm. Mobile Device 400 could then allow the user to take further action on the workflow as appropriate.

Figure 3A:
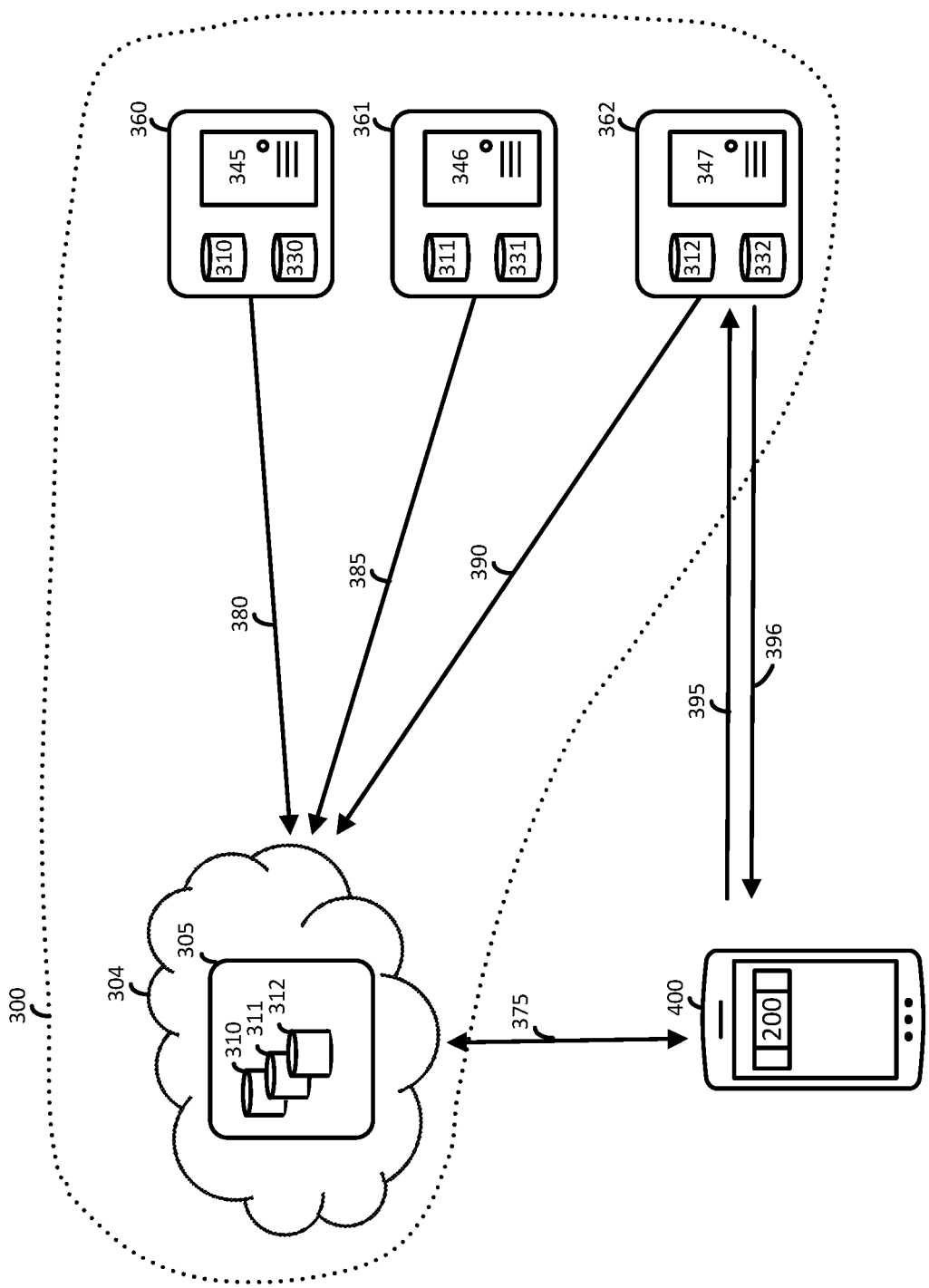
FIG. 3A is a block diagram of alarm notification in an exemplary implementation.

FIG. 3a is a block diagram of alarm notification in an exemplary implementation. Alarms Service 300 comprises Local Alarms Services 360-362 and Cloud-based Notification Service 305. Local Alarms Services 360-362 are in communication with Industrial Process Environment 115. While 3 Local Alarms Services are shown, Alarms service 300 may contain more or fewer local alarms services depending on the implementation. In an implementation, Local Alarms Services 360-362 each connect to different sections of the Industrial Process Environment 115. For example, Local Alarm Service 360 may connect to Mixing Team A's area of the Industrial Process Environment, which would include Alarms related to the mixing speed, temperature, viscosity, time, and ingredient additions that relate to the area of the industrial process in which Team A works, as discussed above. Local Alarms Service 361 may relate to a baking area, and would include measures and alarms for temperature, time, humidity, color, speed, etc. Local Alarm Service 362 may relate to a cooling and packaging section of the Industrial Process Environment 115, which could regulate temperature, humidity, quantity, speed, time, pressure, and other relevant factors. In another implementation, all three of the areas discussed may be included on Local Alarms Service 362, and Local Alarms Service may handle data and alarms from other buildings or plants altogether.

Each of Local Alarms Services 360-362 comprise a notifications database 310-312, an alarms database 330-332, and a web server 345-347. The notifications database 310-312 contains notification configuration data and alarm notification data. The notification configuration data comprises the data that Mobile Device 400 transmits to the Alarms Service 300 from the Alarm Configuration Module 120 as discussed above with reference to FIG. 1. The notification configuration data can also include configuration data that was created at a remote location from Mobile Device 400 specifically for configuration of notifications to Mobile Device 400. The Notifications Database 310-312 also contains alarm notification data associated with the notification configuration data. In other words, when an alarm is triggered that matches an alarm requested in the notification configuration data, data relating to that alarm notification is stored in the Notification Database 310-312.

The Alarms Database 330-332 comprises data from the Industrial Process Environment. This may include real-time process data, real-time alarm data, historical process or alarm data, or other relevant information. Web Server 345-347 can facilitate communication with the Cloud 304 and with Mobile Device 400. The Cloud 304 represents a service that is outside of the local network within the Industrial Process Environment. This could be a virtually hosted data store within the internet, for example.

The cloud-based notification Service 305 is located within the cloud 304, and comprises Notification Databases 310-312. These Notification Databases 310-312 are synched with Notification Databases 310-312 in the Local Alarms Services 360-362, and are thus referred to as the same Notification Databases 310-312. This synching happens over links 380, 385 and 390. The Notification Databases 310-312 contain the alarm notifications that correspond to the notification configuration data. In an implementation, all the alarms data stays in the Local Alarms Services 360-362 to protect security of that data. As such, only the alarm notifications in the Notifications databases 310-312 are synched with the Cloud-based Notification Service 305, and the alarms data remains in the Alarms Databases 330-332 in the Local Alarms Services 360-362.

The Cloud-based Notification Service 305 is in communication with the Mobile Device 400, and passes alarm notifications to the Mobile Device 400 through Link 375. In an implementation, this occurs by having a copy of the Notification Database 310 (and/or 311, 312) on the Mobile Device 400. This Notification Database 310 is synched, and when a new entry becomes part of the Notification Database 310, the information is presented to the Mobile Device 400. The notification database located within Mobile Device 400 may only be a subset of Notification Database 310, as Notification Database 310 may be designed to manage alarms notifications for many users. As discussed above, the notification may be presented to the user in many ways, such as an audible, visual or tactile alarm. In an implementation, Mobile Device 400 receives push notifications from Cloud-Based Notification Service 305, rather than housing a synched database of alarms notifications.

Following the Mobile Device 400 displaying an alarm notification, the user may select the alarm notification in order to see further alarm data. In an implementation, the Mobile Device 400 then requests further alarm data directly from Local Alarms Service 362 (and/or 360, 361) over Link 395. (It should be noted that Link 395 is shown between Mobile Device 400 and Local Alarms Service 362. In an embodiment, similar links exist between Mobile Device 400 and Local Alarms Services 360 and 361). The term "request directly" here is not meant to prohibit any intermediaries. For instance, the request may pass through routers, switches, web servers, etc. on the way to Local Alarms Service 362. Rather it means only that the request does not return to the cloud-based notification service 305, but rather to the Local Alarms Service 362 (and/or 360, 361). In an implementation, this communication may only be possible when Mobile Device 400 is physically present in the Industrial Process Environment 115. In response to the request for further alarm data from Mobile Device 400, Local Alarms Service 362 passes the alarm data to the Mobile Device 400, which then displays the data.

Figure 3B:
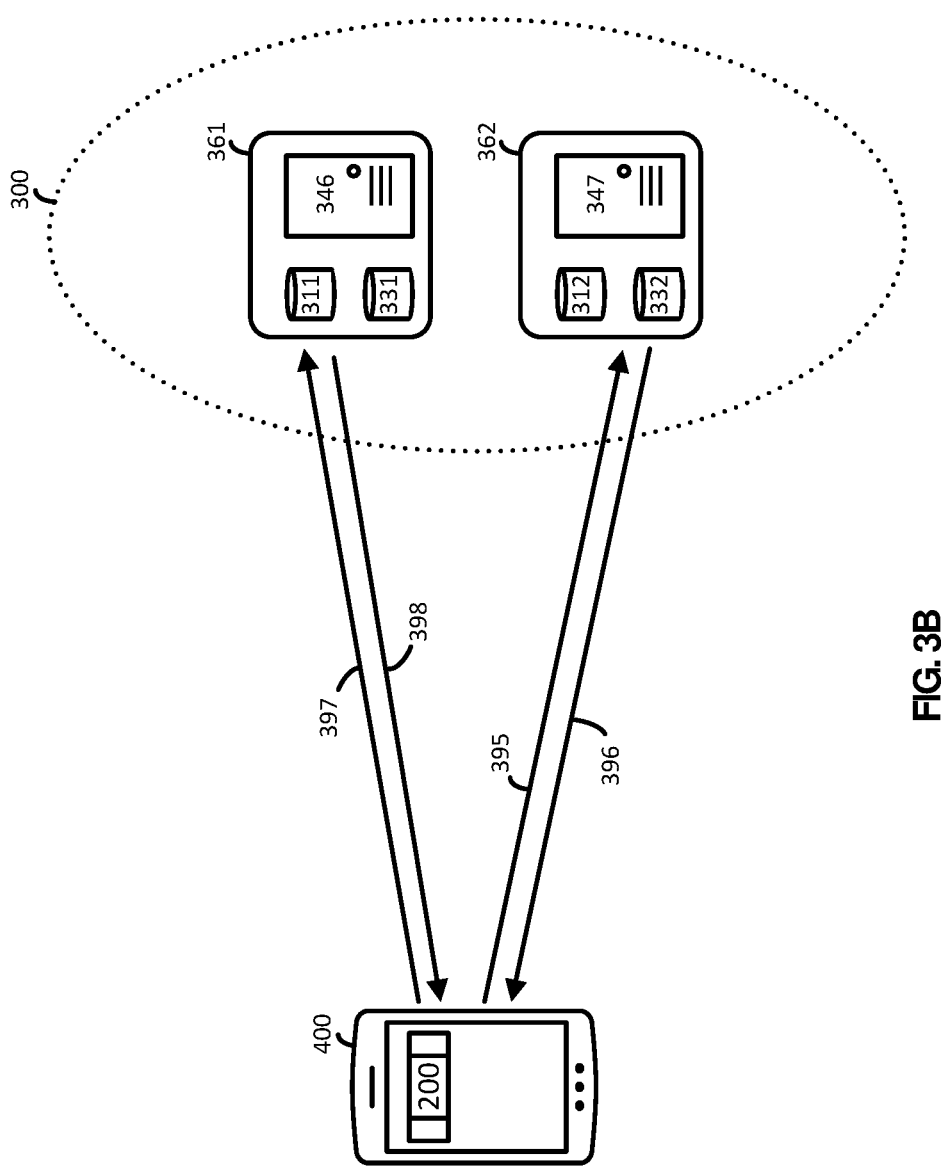
FIG. 3B is a block diagram of alarm notification in an exemplary implementation.

Turning to FIG. 3b, an Alarms Service 300 is shown without a Cloud-based Notification Service 305. In an implementation, the communications with Mobile Device 400 all occur directly, i.e. without a Cloud-based Notification Service 305. This may occur whenever the Mobile Device 400 detects that it is within range of the Industrial Process Environment 115 or Web Servers 346-347, for example. Rather than Cloud-based Notification Service 305 transmitting alarm notifications to Mobile Device 400, Local Alarms Services 361-362 can communicate the notifications to Mobile Device 400 through Web Servers 346-347 respectively over links 396 and 398. In another implementation, the Cloud-based Notification Service 305 is used even when the Mobile Device 400 is within range of the Industrial Process Environment 115 in order to reduce the load on Web Servers 345-347. FIG. 3b shows only two Local Alarms Services 361 and 362. As discussed above, any number of Local Alarms Services 360-362 may be used.

As in FIG. 3a, after an alarm notification is transmitted to Mobile Device 400, whether by database synch, push notification or another method, a user can select the notification to request further alarm data. This request is passed directly to Local Alarms Service 361 or 362 over links 395 or 397 respectively. Local Alarms Service 361 or 362 then responds with further alarm data, which is displayed on Mobile Device 400 on alarm Display 135.

Figure 3C:
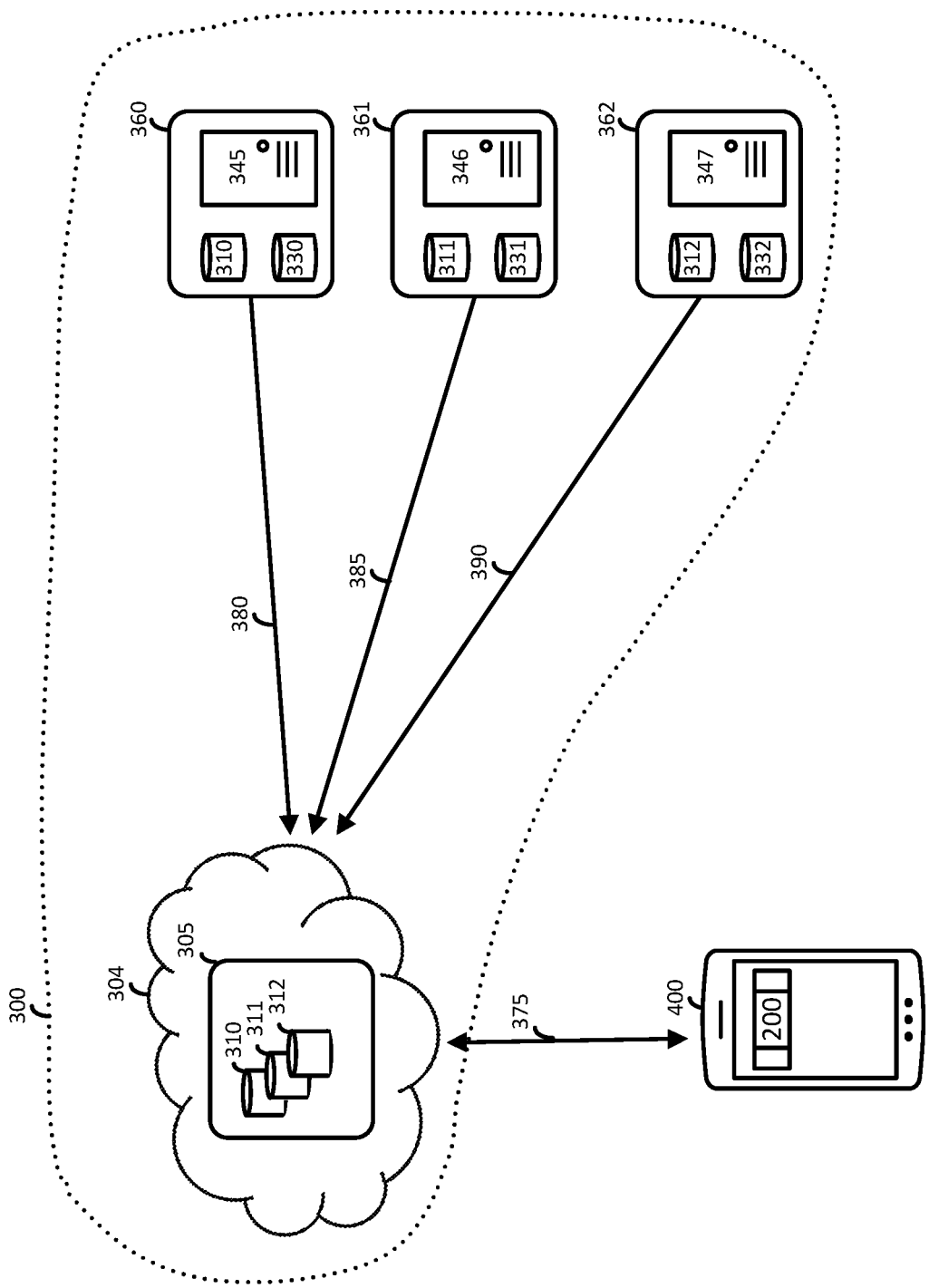
FIG. 3C is a block diagram of alarm notification in an exemplary implementation.

In FIG. 3c, Alarms Service 300 is shown without a direct link between Mobile Device 400 and Local Alarms Services 360-362. In an embodiment, when Mobile Device is physically located off-site of the Industrial Process Environment 115, such that Mobile Device cannot communicate directly with Web Servers 345-347, Mobile Device communicates only with Cloud-based Notification Service 305 with regard to industrial alarms. As in FIG. 3a, Cloud-based Notification Service maintains Notification Databases 310-312, which contain all alarm notification that correspond to the notification configuration data. When an alarm notification arrives, Cloud-based Notification Service 305 presents the alarm notification to the Mobile Device 400. Mobile Device 400 displays the notification in Alarm Notification 125. In an implementation, when Mobile Device has no direct link with Local Alarms Services 360-362, Mobile device will not allow a user to select the alarm notification to request further alarm data. This could take many forms. The Mobile Device 400 might simply not present the option to select further alarm data, or it might return an error when a user attempts to request further alarm data. In this way, confidential alarm data can be confined and held secure within the Industrial Process Environment 115 while still allowing alarm notifications to be passed to Mobile Device 400.

Alarms Databases 330-332 and Notification Databases 31-32 could comprise a disk, tape, integrated circuit, server, or some other memory device. Alarms Databases 330-332 and Notification Databases 31-32 may reside in a single device or may be distributed among multiple memory devices.

FIG. 4 illustrates Mobile Device 400, which is representative of any system or collection of systems in which the various applications, services, scenarios, and processes disclosed herein may be implemented. Examples of Mobile Device 901 include, but are not limited to, smart phones, laptop computers, tablet computers, desktop computers, hybrid computers, gaming machines, virtual reality devices, smart televisions, smart watches and other wearable devices, as well as any variation or combination thereof.

Mobile Device 400 may be implemented as a single apparatus, system, or device or may be implemented in a distributed manner as multiple apparatuses, systems, or devices. Mobile Device 400 includes, but is not limited to, processing system 415, communication interface system 405, and user interface system 410. Processing system 415 further includes, but is not limited to, Memory Device 425, software 430 and Circuitry 420. Processing System 415 is operatively coupled with communication interface system 405, and user interface system 410 (optional).

Processing system 415 loads and executes software 430 from Memory Device 425. Software 430 includes processes 440 and 445 and database 435, which are representative of the processes discussed above, including Alarm Configuration 120, Alarm Notification 125, and Alarm Display 135. When executed by processing system 415 to enhance industrial alarms notification, software 430 directs processing system 415 to operate as described herein for at least the various processes, operational scenarios, and sequences discussed in the foregoing implementations. Mobile Device 400 may optionally include additional devices, features, or functionality not discussed for purposes of brevity.

Referring still to FIG. 4, processing system 415 may comprise a micro-processor and other circuitry 420 that retrieves and executes software 430 from Memory Device 425. Processing system 415 may be implemented within a single processing device, but may also be distributed across multiple processing devices or sub-systems that cooperate in executing program instructions. Examples of processing system 415 include general purpose central processing units, graphical processing unites, application specific processors, and logic devices, as well as any other type of processing device, combination, or variation.

Memory Device 425 may comprise any computer readable storage media readable by processing system 415 and capable of storing software 430. Memory Device 425 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Memory Device 425 may be implemented as a single storage device, but may also be implemented across multiple storage devices or sub-systems co-located or distributed relative to each other. Memory Device 425 may comprise additional elements, such as a controller, capable of communicating with processing system 415 or possibly other systems.

Software 430 may be implemented in program instructions and among other functions may, when executed by processing system 415, direct processing system 415 to operate as described with respect to the various operational scenarios, sequences, and processes illustrated herein. For example, software 430 may include program instructions for implementing Notification Database 435, Configuration Module 440, and Notification Module 445.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 430 may include additional processes, programs, or components, such as operating system software, virtual machine software, or other application software, in addition to or that include Notification Database 435, Configuration Module 440 and/or Notification Module 445. Software 430 may also comprise firmware or some other form of machine-readable processing instructions executable by processing system 415.

In general, software 430 may, when loaded into processing system 415 and executed, transform a suitable apparatus, system, or device (of which Mobile Device 400 is representative) overall from a general-purpose computing system into a special-purpose computing system to enhance industrial alarm notification. Indeed, encoding software 430 on Memory Device 425 may transform the physical structure of Memory Device 425. The specific transformation of the physical structure may depend on various factors in different implementations of this description. Examples of such factors may include, but are not limited to, the technology used to implement the storage media of Memory Device 425 and whether the computer-storage media are characterized as primary or secondary storage, as well as other factors.

For example, if the computer readable storage media are implemented as semiconductor-based memory, software 430 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 405 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 410 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 410. In some cases, the input and output devices may be combined in a single device, such as a display capable of displaying images and receiving touch gestures. The aforementioned user input and output devices are well known in the art and need not be discussed at length here.

User interface system 410 may also include associated user interface software executable by processing system 415 in support of the various user input and output devices discussed above. Separately or in conjunction with each other and other hardware and software elements, the user interface software and user interface devices may support a graphical user interface, a natural user interface, or any other type of user interface.

Communication between Mobile Device 400 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

Figure 5:
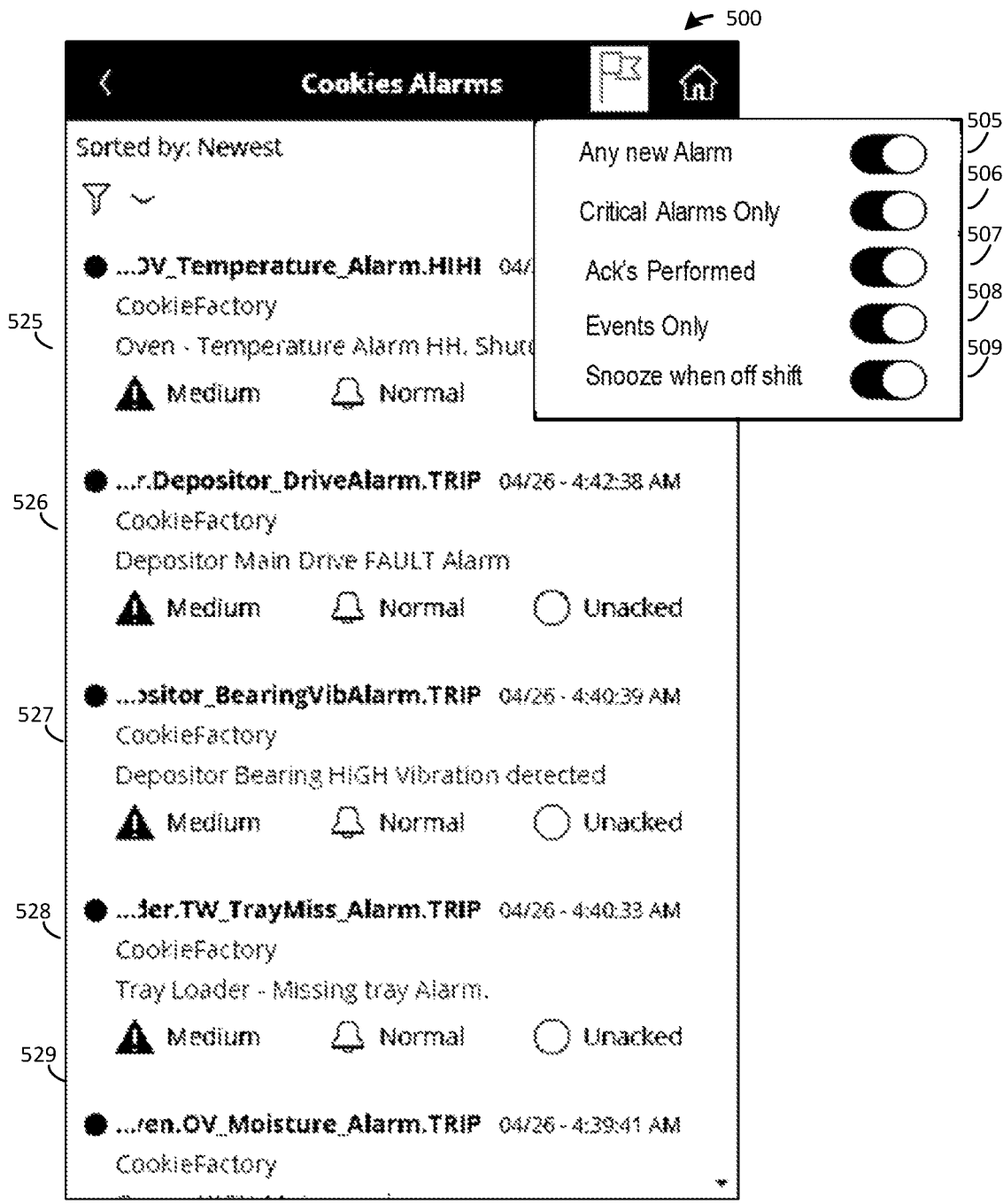
FIG. 5 illustrates a user interface in an exemplary implementation.

In FIG. 5, Alarms Interface 500 illustrates a user interface in an exemplary implementation. Alarm Notifications 525-529 represent alarm notification displayed for a cookie plant. As discussed above, these notifications are stored in the Notifications Database 310 when the local Alarms Service 360 determines that the alarm data in the Alarms database 330 is associated with configuration data for Mobile Device 400. Alarm Notifications 525-529 are then transmitted to the Mobile Device 400 and Displayed in Alarms Interface 500. In an implementation, one of the Alarm Notifications 525-529—for instance Alarm Notification 527—can be selected by a user. Following this selection, Mobile Device 400 will request further alarm data related to alarm Notification 527 from Local Alarms Service 360. This further alarm data may include, for example, a real-time chart showing the current and historical vibration level of the Depositor Bearing.

Alarm Selectors 505-509 relate to the configuration of notifications in Mobile Device 400. Each of Alarm Selectors 505-509 represent alarms that can be selected for delivery to Mobile Device 400 in an implementation. As shown in FIG. 5, all of Alarm Selectors 505-509 are currently selected, so any alarm that relates to Alarm Selectors 505-509 will be delivered to Mobile Device 400 by Local Alarms Service 360-362 or by Cloud-based Notification Service 305.

Figure 6:
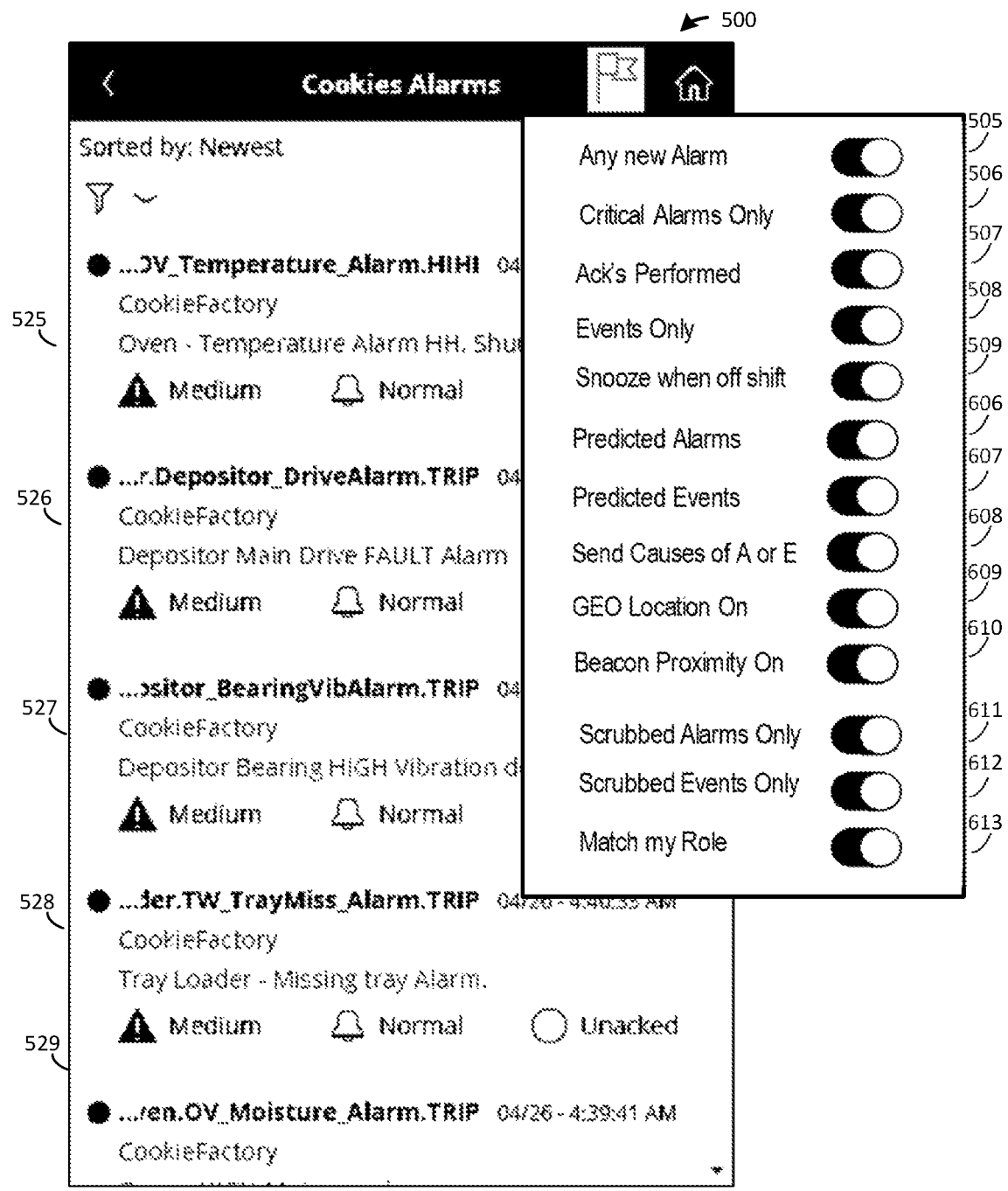
FIG. 6 illustrates a user interface in an exemplary implementation.

Turning to FIG. 6, additional Alarm selectors 606-613 have been added to the display of FIG. 5. In an implementation, various users can have access to different alarms. By way of example, Alarm selectors 606-607 relate to predicted alarms. These alarms may be more relevant to users with management oversight over portions of the Industrial Process Environment. Thus, in an implementation, these alarm options are only shown to users according to their job level or some other factor.

Figure 7:
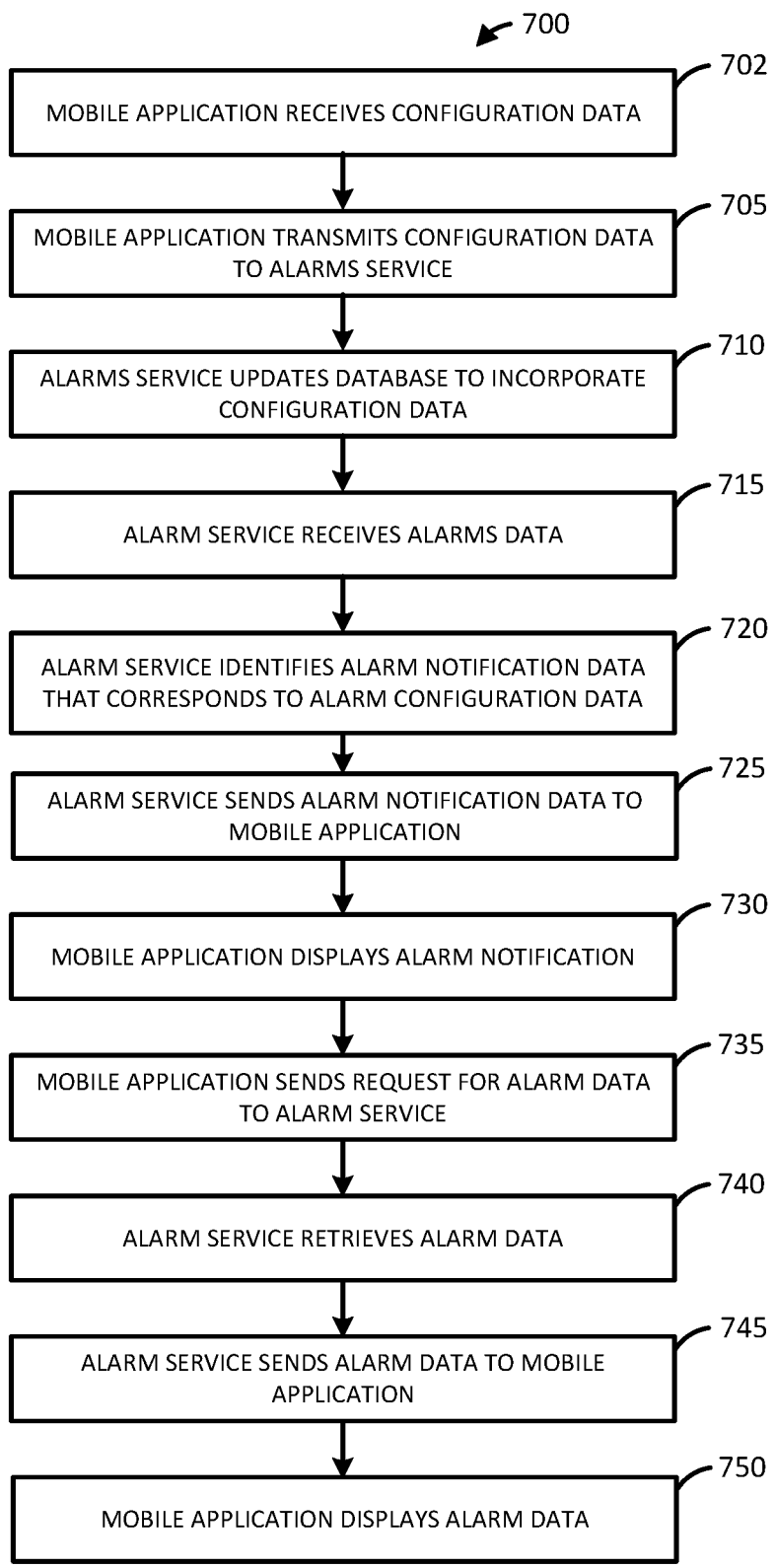
FIG. 7 is a method of alarm notification customization in an exemplary implementation.

FIG. 7 represents a method of alarm notification customization in an exemplary implementation. In step 702, the Mobile Device 400 receives input from a user through a mobile application representing notification configuration data. This data can represent alarms that have been selected for display to the user on Mobile Device 400. The notification configuration data may further represent alarms that have been selected or defined for display to a physical user at any device that s part of the alarm system. Thus, after configuration, when a user logs into a different device in the alarm system, the configured alarms may display at the different device. In Step 705, the configuration data is transmitted to Alarms Service 300. This may take place by the Mobile Device 400 transmitting configuration data to Local Alarms Service 360, or to Cloud-based Notification Service 305. The Local Alarms Service 360, or to Cloud-based Notification Service 305 then incorporates the notification configuration data into the Notification Database 310-312. The notification configuration data can then be synched between Local Alarms Service 360 and Cloud-based Notification Service 305.

Alarms Service 300 receives alarms data from Industrial Process Environment 115 through Local Alarms Service 360 in Step 715. This data can include raw data from equipment within Industrial Process Environment 115 as well as alarms that are produced and displayed within Industrial Process Environment 115. In Step 720, Alarms Service 300 processes the alarms data to identify alarm notifications that correspond to notification configuration data. This step can include analysis of the alarms data within Alarms Service 300 to determine what alarms should create notifications. In an implementation, the Alarms Service 300 may create alarm notifications that cover multiple devices within the Industrial Process Environment 115, or may create alarms that track a single measurement device within the Industrial Process Environment 115. The alarm notifications created are in response to the notification configuration data presented by Mobile Device 400, which can vary from low-level alarms to high=level alarms. In Step 725, Alarm notification data is transmitted to Mobile Device 400 that corresponds to notification configuration data for Mobile Device 400. This transmittal may take the form of a database synch, push notifications, or some other form.

In Step 730, Mobile Device displays the alarm notification. This display includes a method to select the notification, whether by selecting the notification itself, or selecting an item corresponding to the notification. The Mobile Device 400 then receives a selection of the alarm notification from a user, and, in Step 735, sends a request for alarm data to the Alarms Service 300. This request, in an implementation, is sent to the Local Alarms Service 360. The Alarms Service 300 then retrieves the alarm data related to the alarm notification that has been selected in Step 740. This data is stored in the Alarms Database 330 within the Local Alarms Service 360. In step 745, the Alarm Service 300 sends the alarm data to the Mobile Device 400, and in Step 750, the Mobile Device 400 displays the alarm data. The alarm data may include real-time data, historical data, predictive data, previous alarm notifications, etc. The display may also take many forms.

Figure 8:
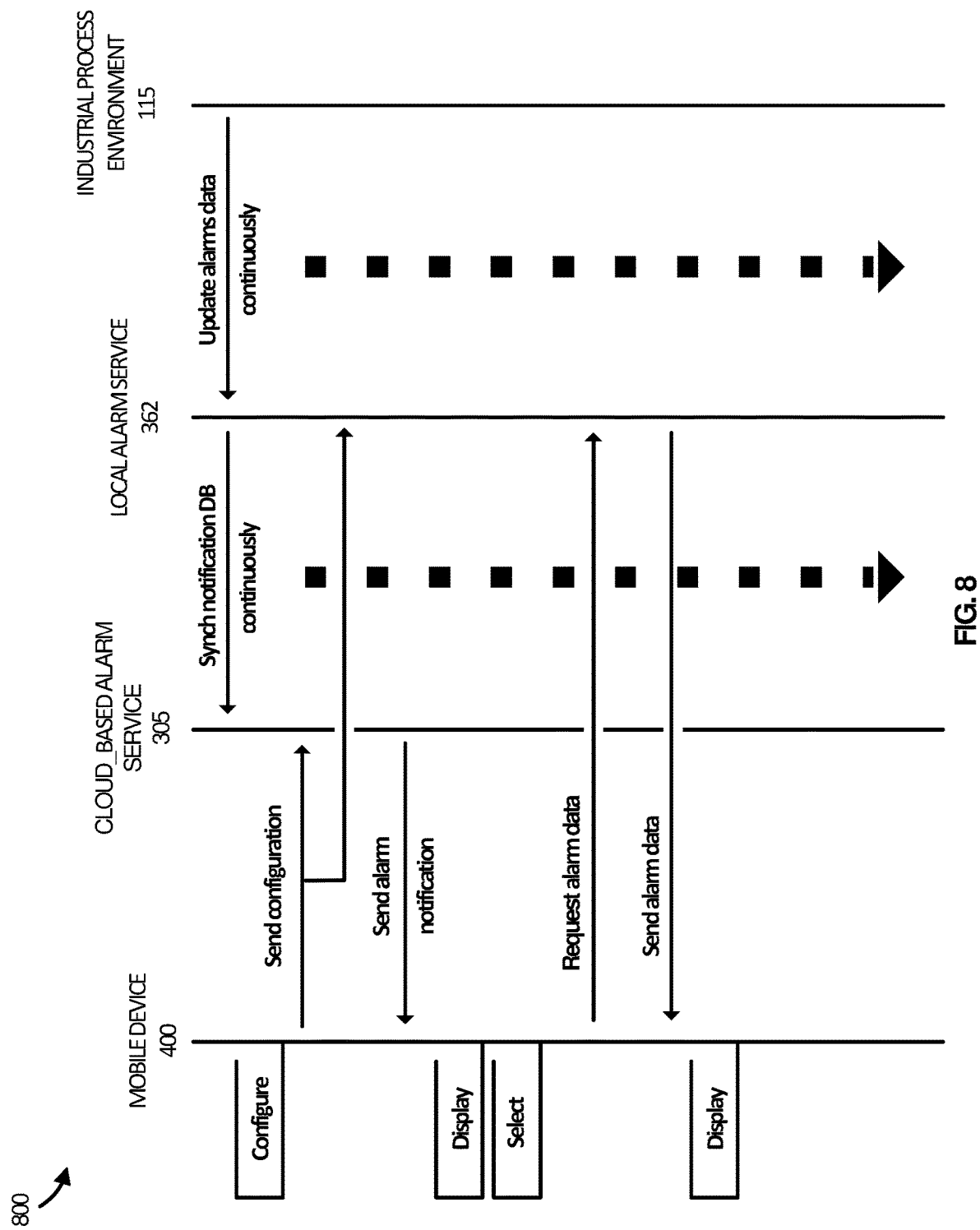
FIG. 8 illustrates an operational scenario in an exemplary implementation.

In FIG. 8, 800 represents an operational scenario in an implementation. The Industrial Process Environment 115 provides updated alarms data to Local Alarm Service 362 continuously. This data is stored in Alarms database 332. Similarly, the Notification Database 312 is constantly synching between Local Alarm Service 362 and Cloud-based Notification Service 305.

In Mobile Device 400, user selected alarm notification configuration is received, and the notification configuration data is provided to Cloud-based Notification Service 305 and Local Alarm Service 362. When Alarms Service 300 detects an alarm that corresponds to notification configuration data provided by Mobile Device 400, Cloud-based Notification Service 305 sends an alarm notification to Mobile Device 400. Mobile Device 400 displays the alarm notification to a user, and receives a selection from the user indicating that more alarm data is requested related to the alarm notification. The Mobile Device sends a request for further alarm data to the Local Alarm Service 362. Local Alarm Service 362 returns the requested data to Mobile Device 400, and Mobile Device 400 displays the alarm data.

Figure 9:
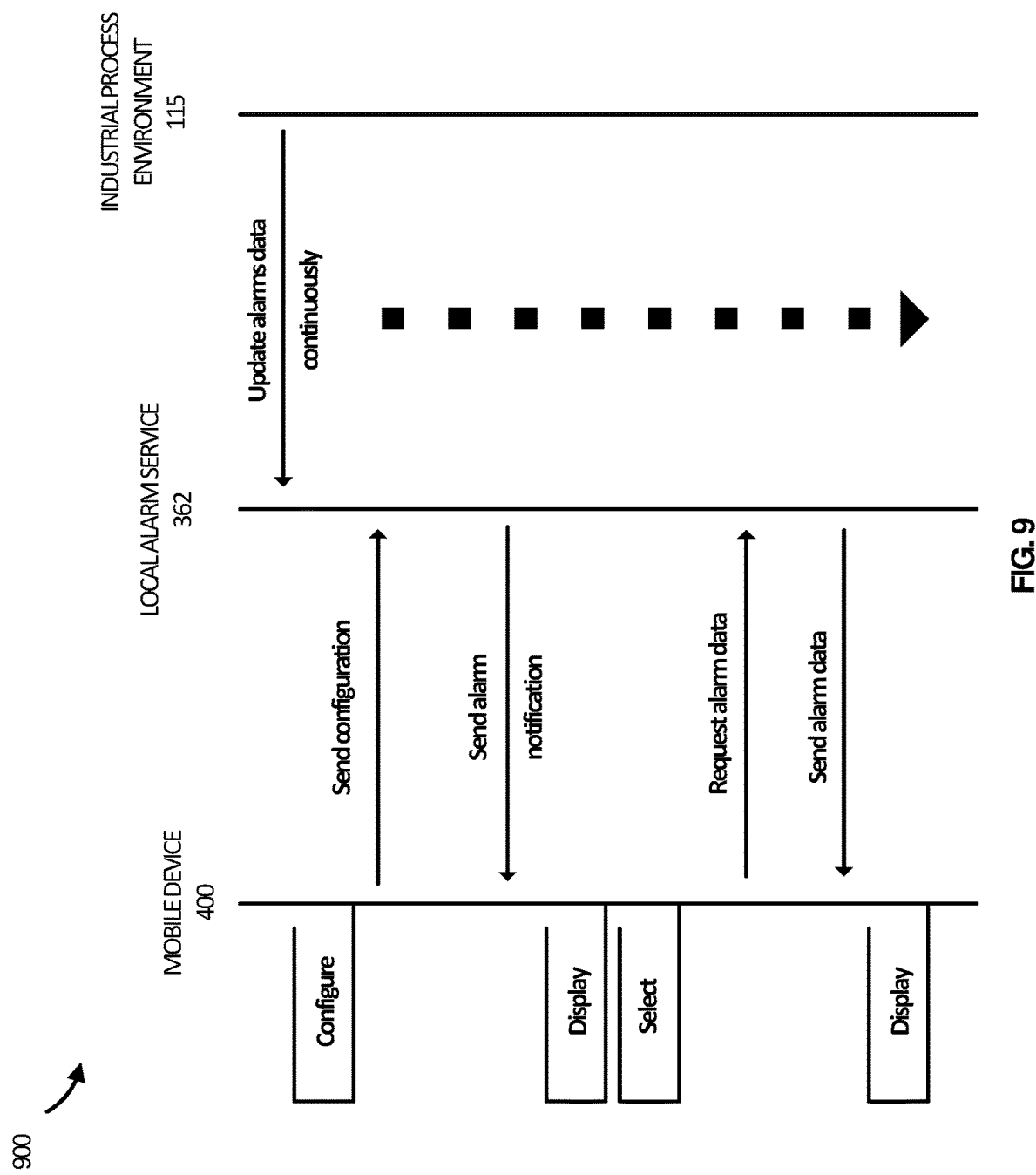
FIG. 9 illustrates an operational scenario in an exemplary implementation.

FIG. 9 presents another operational scenario. In FIG. 9, Alarms Service 300 does not include a Cloud-based Notification Service 305. As in FIG. 8, the Industrial Process Environment constantly provides alarm data to Local Alarm Service 362. The alarm data is stored in Alarms Database 332.

In Mobile Device 400, user selected alarm notification configuration is received, and the notification configuration data is provided to Local Alarm Service 362. When Alarms Service 300 detects an alarm that corresponds to notification configuration data provided by Mobile Device 400, Local Alarms Service 362 sends an alarm notification to Mobile Device 400. Mobile Device 400 displays the alarm notification to a user, and receives a selection from the user indicating that more alarm data is requested related to the alarm notification. The Mobile Device sends a request for further alarm data to the Local Alarm Service 362. Local Alarm Service 362 returns the requested data to Mobile Device 400, and Mobile Device 400 displays the alarm data.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An apparatus comprising:
a memory that stores executable components; and
a processor, operatively coupled to the memory, that executes the executable components, the executable components comprising:
  a mobile application configured to:
    in response to an input, via a configuration module of the mobile application, specifying notification criteria related to an available alarm in an industrial process environment, upload the notification criteria from the mobile application to an alarm service that receives alarms from the industrial process environment,
    in response to receiving a notification from the alarm service that satisfies the notification criteria, enable display of the notification from the alarm service in a notification module, and
    in response to receiving a selection of the notification via the notification module, download the available alarm and execute a workflow process related to the available alarm; and
  the notification module configured to receive the selection of the notification.

2. The apparatus of claim 1, wherein the alarm service further comprises a notification service.

3. The apparatus of claim 2, wherein the alarm service is located proximate to the industrial process environment.

4. The apparatus of claim 2, wherein the notification from the alarm service is received from the notification service.

5. The apparatus of claim 2, wherein the available alarm depends on at least one of the following factors: physical location of the apparatus, job title of a user, responsibilities of the user, and permissions of the user.

6. The apparatus of claim 1, wherein the mobile application is further configured to verify that the apparatus is physically proximate to the industrial process environment.

7. The apparatus of claim 2, wherein the alarm service further comprises a cloud-based notification service.

8. The apparatus of claim 7, wherein the notification from the alarm service is received from the notification service when the apparatus is physically proximate to the industrial process environment and the notification from the alarm service is received from the cloud-based notification service when the apparatus is not physically proximate to the industrial process environment.

9. A non-transitory computer readable medium having stored thereon instructions that, in response to execution, cause a system comprising a processor to perform operations, the operations comprising:
  in response to an input specifying notification criteria related to an available alarm in an industrial process environment, uploading the notification criteria from a mobile application to an alarm service that receives alarms from the industrial process environment;
  in response to receiving a notification from the alarm service that satisfies the notification criteria, enabling display of the notification from the alarm service in a notification module of the mobile application; and
  in response to receiving a selection of the notification via the notification module, downloading the available alarm and executing a workflow process related to the available alarm.

10. The non-transitory computer readable medium of claim 9, wherein the alarm service further comprises a notification service.

11. The non-transitory computer readable medium of claim 10, wherein the alarm service is located proximate to the industrial process environment.

12. The non-transitory computer readable medium of claim 10, wherein the notification from the alarm service is received from the notification service.

13. The non-transitory computer readable medium of claim 10, wherein the available alarm depends on at least one of the following factors: physical location of the non-transitory computer readable medium, job title of a user, responsibilities of the user, and permissions of the user.

14. The non-transitory computer readable medium of claim 9, wherein the operations further comprise verifying that a device running the mobile application is physically proximate to the industrial process environment.

15. The non-transitory computer readable medium of claim 10, wherein the alarm service further comprises a cloud-based notification service.

16. The non-transitory computer readable medium of claim 15, wherein the notification from the alarm service is received from the notification service when that a device running the mobile application is physically proximate to the industrial process environment and the notification from the alarm service is received from the cloud-based notification service when that the device running the mobile application is not physically proximate to the industrial process environment.

17. A method for providing notifications and alarms relating to an industrial process environment, comprising:
  in response to an input specifying notification criteria related to an available alarm in the industrial process environment, uploading, by a system comprising a processor, the notification criteria from a mobile application to an alarm service that receives the alarms from the industrial process environment;

in the alarm service, by a different system comprising a different processor:
  in response to receiving the notification criteria from the mobile application, storing the available alarm, identifying an alarm corresponding to the notification criteria, and returning a notification associated with the alarm to the mobile application; and
enabling, by the system, display of the notification in the mobile application via a notification module of the mobile application;
in response to receiving a selection of the notification in the mobile application via the notification module, downloading, by the system, the alarm; and
executing, by the system, at least one workflow process related to the alarm.

18. The method of claim 17, further comprising, in the mobile application, by the system:
  requesting the alarm from the alarm service, and enabling display of the alarm.

19. The method of claim 18 further comprising, in the mobile application, by the system:
  determining that a mobile computing device running the mobile application is physically proximate to the industrial process environment and requesting the alarm at least in part because the mobile computing device is physically proximate to the industrial process environment.

20. The method of claim 17 further comprising, in the alarm service, by the different system, determining that a mobile computing device running the mobile application is not physically proximate to the industrial process environment, and wherein returning the notification comprises returning the notification through a cloud-based notification service, at least in part because the mobile computing device is not physically proximate to the industrial process environment.

* * * * *